United States Patent [19]
Eguchi et al.

[11] 3,726,992
[45] Apr. 10, 1973

[54] MULTIPLEX COMMUNICATION SYSTEM FOR TRANSMITTING TELEVISION AND FACSIMILE SIGNALS

[75] Inventors: Fumio Eguchi, Osaka; Fumio Ando, Tokyo, both of Japan

[73] Assignees: Mainichi Broadcasting System, Osaka; Nippon Electric Company Limited, Tokyo, both of Japan

[22] Filed: Dec. 7, 1970

[21] Appl. No.: 95,982

Related U.S. Application Data

[63] Continuation of Ser. No. 696,972, Jan. 4, 1968, abandoned.

[52] U.S. Cl..........178/5.6, 178/DIG. 3, 178/DIG. 23
[51] Int. Cl...............................................H04n 7/08

[58] Field of Search...............................178/5.6, 5.8; 177/15 A, 15 AB; 325/31; 179/15.55

[56] References Cited

UNITED STATES PATENTS

| | | | |
|---|---|---|---|
| 2,671,130 | 3/1954 | Weighton | 178/5.6 |
| 3,324,237 | 6/1967 | Cherry et al. | 179/15.55 |

*Primary Examiner*—Robert L. Richardson
*Attorney*—Hopgood & Calimafde

[57] ABSTRACT

A multiplex communications system is described in which a continuous signal having a relatively narrow frequency band such as a facsimile signal, may be superimposed on a signal having periodic idle intervals such as a television signal.

10 Claims, 8 Drawing Figures

INVENTORS
FUMIO EGUCHI
FUMIO ANDO
BY
Hopgood & Calimafde
ATTORNEYS

INVENTORS
FUMIO EGUCHI
FUMIO ANDO

BY

Hopgood & Calimafde
ATTORNEYS

INVENTORS
FUMIO EGUCHI
FUMIO ANDO
BY
Hopgood & Calimafde
ATTORNEYS

INVENTORS
FUMIO EGUCHI
FUMIO ANDO
BY
Hopgood & Calimafde
ATTORNEYS

MULTIPLEX COMMUNICATION SYSTEM FOR TRANSMITTING TELEVISION AND FACSIMILE SIGNALS

This is a continuation of application Ser. No. 696,972 filed Jan. 4, 1968, now abandoned.

This invention relates to a multiplex communication system for transmitting a superposition on a signal having periodic idle intervals, such as a television signal, or a continuous signal having a narrower frequency band, such as facsimile signal.

Transmission of two sorts of signals through a channel has been carried out by frequency multiplication, time-division multiplication, phase multiplication, or the like. This invention provides a time-division multiplex communication system wherein use is made of the blanking intervals of a television signal in consideration of the effective utilization of the broadcast electromagnetic wave and characteristics of the television signal.

This invention, when applied to the multiplex transmission of a television signal and a facsimile signal, makes it possible to receive the television program together with pictures for permanent record, without any modification of a conventional television transmitter or receiver but with some additional devices for the multiplication. For example, it becomes possible, while watching an education program, to receive the points, the data, the tables, the textbook, and the like. Alternatively, it is feasible to receive at pertinent intervals of the television reception special news, programs, stock prices, and others. Thus, this invention has various applications and enables the more effective transmission of information.

A proposal has been made towards a system for inserting a facsimile signal interposed into the blanking intervals of a television signal. This system has drawbacks due to the particular restrictions imposed on the period of scanning of the facsimile receiver, because the period of scanning of the fascimile signal during production must naturally be in specific relation to the scanning period of the television signal.

The system according to this invention removes the above-mentioned drawbacks and is a system for transmitting, superposed on a television signal, a signal of a fascimile apparatus whose period of scanning is independent of the period of scanning of the television signal. With this system, it is rendered possible to resort to a conventional manner of synchronization between the facsimile transmitter and receiver, such as the power-source synchronization or the forced synchronization normally used in the transmission of the fascimile signal. This affords a merit of enabling any fascimile transmitter and receiver in service to be used as they are and, furthermore, provides improvements in the quality of the received fascimile pictures and in the stability of the complete system.

To summarize the principles, this invention relates to a multiplex communication system for a signal having periodic idle intervals and a continuous signal having a relatively narrower frequency band. The former signal may be a television signal, while the latter may be a fascimile signal. For the convenience of explanation, the invention will hereafter be described relative to the last-mentioned two signals, by way of example.

Figure 1:
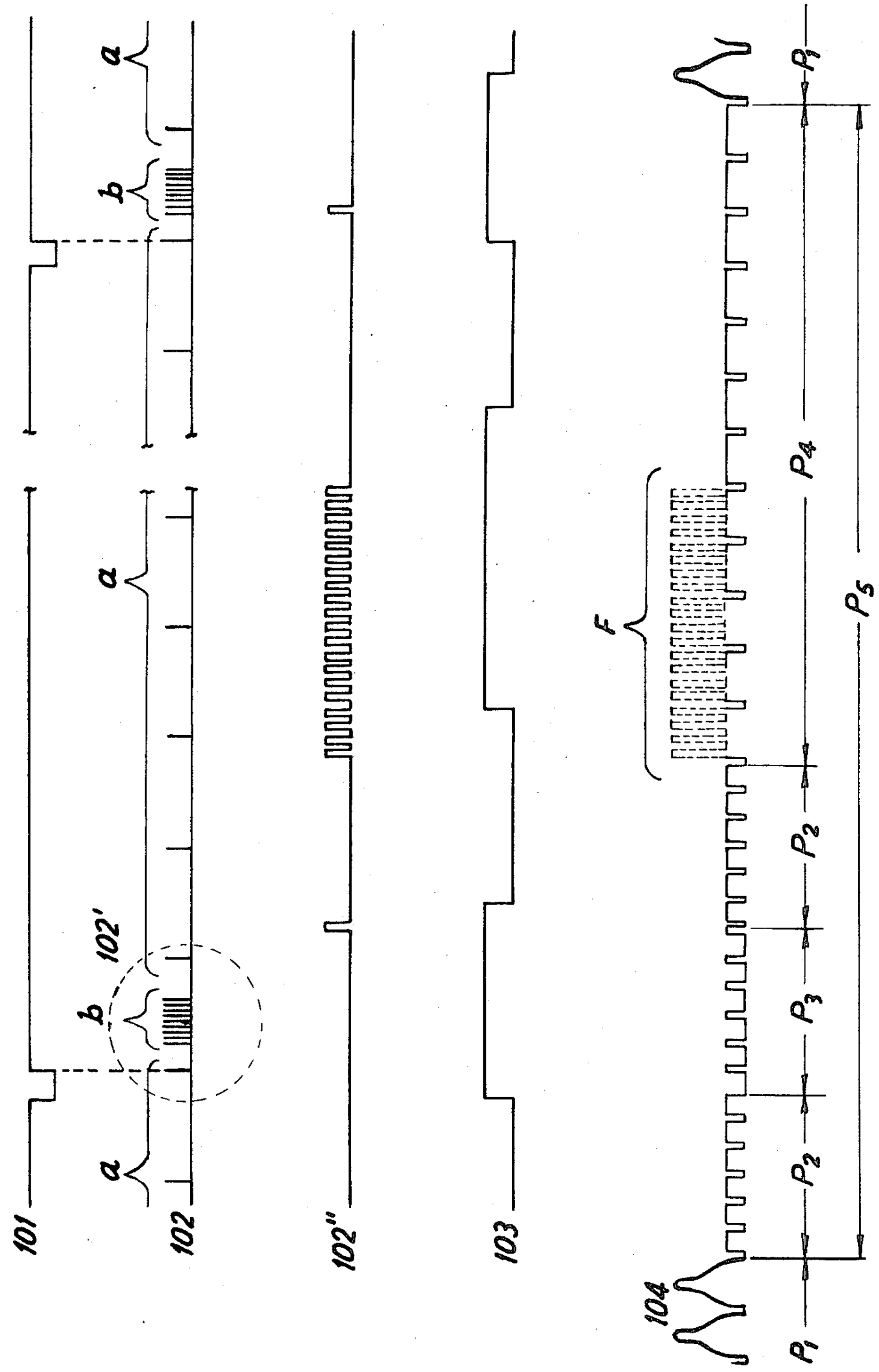
FIG. 1 shows wave forms for illustrating the basic principles of this invention.

As is well-known, a television signal has a blanking interval (blanking period) for each horizontal and vertical scanning, which interval is an idle interval not used for transmission of the picture. According to Japanese television broadcast standard, these intervals amount to 14 percent for horizontal and 8 percent for vertical. These intervals, although used in transmitting the synchronizing signal train for timing the scanning in the receivers, mostly remain unutilized. This invention proposes the superposition of a fascimile signal on the idle intervals within the video signal level. In FIG. 1, a wave form 104 shows an example of the wave form obtained by superposing a facsimile signal on those television signal portions occurring during the vertical blanking intervals. The broken line portion F represents the fascimile signal. It will be understood that the fascimile signal which usually is a continuous binary signal must be concentrated, before superposition, into signal blocks for superposition on the F intervals. The duration of an F interval is optional, provided it falls within an idle interval of the television signal. In order to avoid the adverse effects on the television synchronizing signal train, superposition is carried out avoiding the periods in which the synchronizing signal train assumes the blacker than black level. Furthermore, superposition is effected such that the fascimile signal level peak does not exceed the white peak of the television picture signal. Thus, the superposition of the facsimile signal has no effects on the blacker than black level, the synchronizing signal portions of the television signal on the synchronization in the receivers, and prevents the superimposed signal from appearing in the received picture by virtue of the blanking circuit of the receiver notwithstanding the fact that the black level is warranted throughout the blanking intervals to enable the blanking accomplished within the receiver. Inasmuch as there is no picture information in the television signal during the blanking intervals and as different levels are assigned to the television synchronizing train and the fascimile signal, respectively, it is feasible to separate the fascimile signal by means of a gate operable with the television synchronizing signal train and a level discriminator and thus avoid any adverse effects of the television signal on the facsimile signal.

Figure 2:
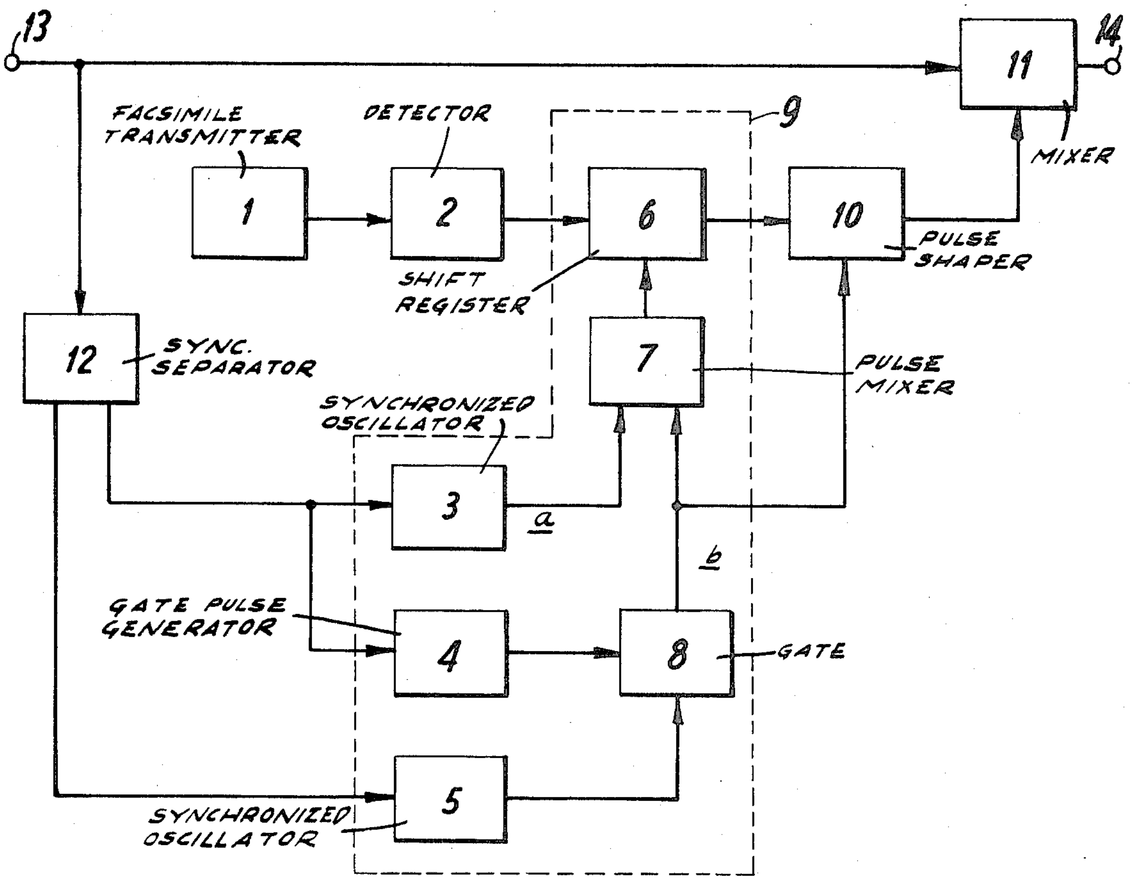
FIG. 2 is a block diagram of an embodiment of the transmitter of this invention.

An embodiment of this inventfon will now be explained with reference to the wave forms illustrated in FIG. 1 and the block diagram of FIG. 2.

The output of a fascimile transmitter 1 is detected by a detector 2 to become a facsimile signal 103. The levels of the wave form 103 represent the bright and the dark portions of the original picture being transmitted. The television signal to be multiplexed is supplied to a terminal 13, from which signal the horizontal and the vertical synchronizing signals are derived by a synchronizing signal separator 12. The vertical synchronizing signal train 101 is fed to a synchronized oscillator 3. Controlled by the vertical synchronizing signal, the synchronized oscillator 3 produces a continuous pulse train *a* of 1200 cycles which is twenty times the 60-cycle repetition frequency of the vertical synchronizing signal train and feeds that pulse train to a pulse mixer 7. The horizontal synchronizing signal train which is the remainder of the signals derived by the synchronizing signal separator 12 is led to another synchronized oscillator 5. Controlled by the horizontal synchronizing signal, this synchronized oscillator 5 produces another train of pulses of 63 kilocycles which is four times the 15.75-kilocycle repetition frequency of the horizontal synchronizing signal train. In synchronism with the vertical synchronizing signal train, a gate pulse generator 4 produces a gate pulses each within a blanking interval. Thus, a gate 8 produces pulse groups *b* each consisting of twenty pulses of the 63-kilocycle pulses, which groups are mixed at the pulse mixer 7 with the 1200-cycle continuous pulse train *a* to form a clock pulse train 102. The reason why the clock pulse train 102 is of this construction will soon become clear. The clock pulse train 102 and the fascimile signal 103 derived by the detector 2 are fed to a shift register 6, which is widely used as a memory element for digital signals. In this embodiment, the shift register 6 is of 20-bit capacity and performs sampling, through its logical operation, of the facsimile signal 103 by the continuous pulse train *a* of the clock pulse train 102, storing, and reading-out by the pulse groups *b* of the clock pulse train 102 to derive binary signal groups having the same bits as the pulse groups *b*. At the same time, the shift register 6 similarly performs storing by the pulse groups *b* and reading out of the stored information by the continuous pulse train *a* to derive another binary signal train, which is not the objective and is removed by a succeeding pulse shaper 10. For convenience, a block containing the elements 3, 4, 5, 6, 7, and 8 will be called a signal transforming block 9. The pulse shaper 10 shapes the binary signal trains derived by the shift register 6, by the pulse groups *b* supplied from the gate 8 into a binary signal which is the same pulse width as the pulse groups *b* for convenience of superposition on the television signal and which is actually superposed by a mixer 11 on the television signal and then fed to a television transmitter through an output terminal 14. The wave form 104 shows the television signal having the last-mentioned binary signal superposed thereon, wherein the brightness of the fascimile original picture is represented by the pulse amplitude (inasmuch as the pulses are binary, by the presence and absence of pulses). In this figure: $P_1$ shows the periods of the video signal; $P_2$, the periods of the equalizing pulses; $P_3$, the periods of the vertical synchronizing pulse train; $P_4$, the periods of the horizontal synchronizing signal train arranged in the vertical blanking periods $P_5$; and F, the pulse groups derived from the fascimile signal.

Figure 3:
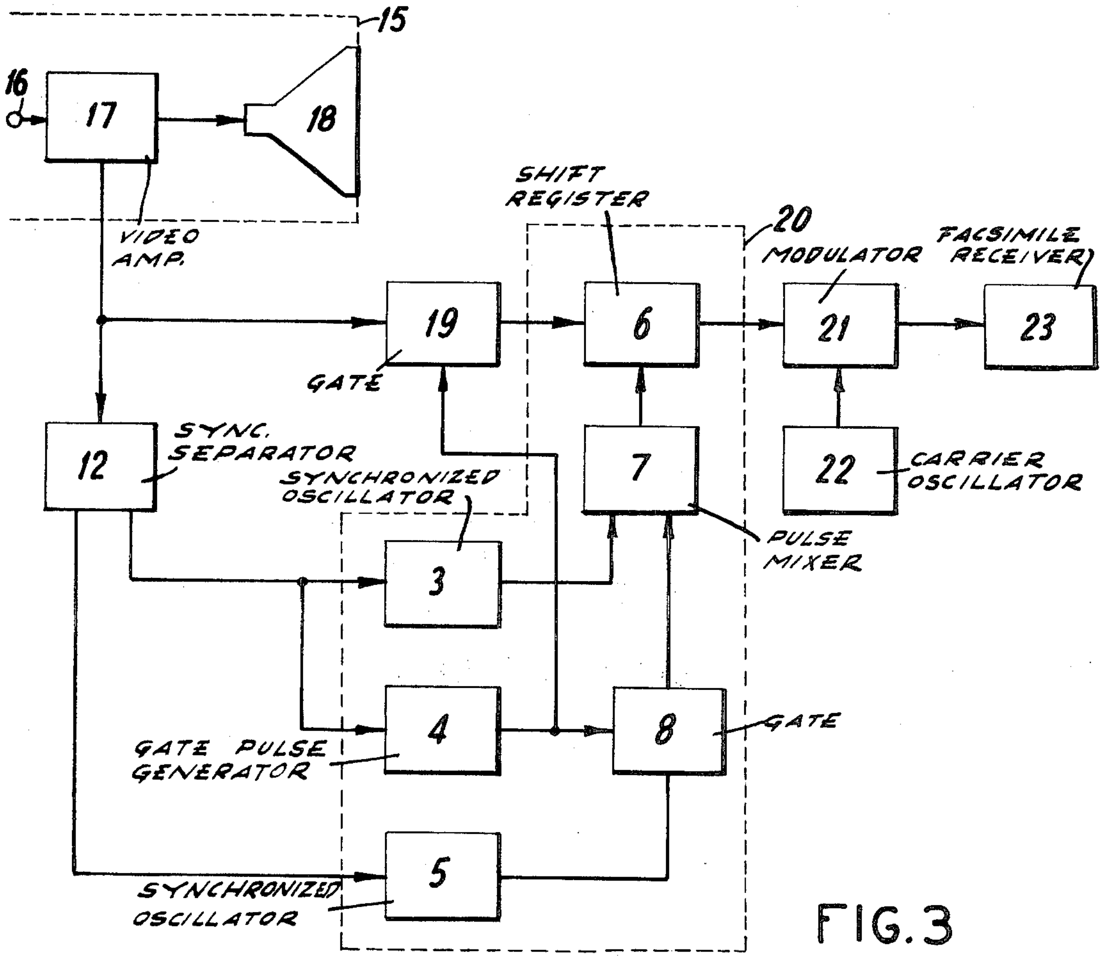
FIG. 3 is a block diagram of an embodiment of the receiver of this invention.

An embodiment of the receiver of this invention will now be described with reference to FIG. 3.

A television receiver 15 is illustrated, with its principal portion having connection with this invention being shown. The broadcast television electromagnetic wave received by the television receiver is led to a high-frequency circuit, sufficiently amplifier, and then detected. The resulting television signal is led through an input terminal 16 to a video amplifier 17. The amplified signal is applied to a cathode-ray tube 18 to reproduce the television picture. In order to separate the fascimilie signal superposed on the television signal according to this invention, the amplified television signal is partly fed from the video amplifier 17 to a gate 19 and a synchronizing signal separator 12. The synchronizing signal separator 12 separates the horizontal and the vertical synchronizing signal trains from the television signal, as in the transmitter of FIG. 2. The vertical synchronizing signal train inter alia is led to a gate pulse generator 4 which produces gate pulses like those of the transmitter of FIG. 2 for gating at the gate 19 the fascimile signal superposed on the television signal. The recovered fascimile signal is supplied to a shift register 6. A signal recovering block 20 having the shift register 6 as the principal element is of the same construction as the signal transforming block 9 of the transmitter, wherein the elements 3, 4, 5, 6, 7, and 8 of FIG. 3 correspond to the elements having the same reference numerals in FIG. 2. For the transmitter of FIG. 2, the block 9 is used to concentrate a continuous signal within certain intervals by substituting therefor 20-bit pulse groups, while the block 20 of the same construction is used to carry out the reverse process in the receiver of FIG. 3. Thus, the pulse groups concentrated within certain intervals are reconverted into a continuous signal. Although it has been assumed for convenience during the explanation of the transmitter, the sampling and storing are carried out by twenty pulses of the larger repetition period of the clock pulse train, and that reading-out is accomplished by twenty pulses of the shorter repetition period, use is possible of the above-mentioned storing clock pulses and reading-out clock pulses as the reading-out and the storing pulses, respectively, because a shift register simultaneously performs storing and reading-out in principle. It will thus be understood that the same circuit can perform both signal concentration and expansion which differ from each other only as to the output signal portions to be utilized. In this manner, the output of the shift register 6 is a fascimile signal in the form of a continuous binary signal train which is the replica of the fascimile signal 103 prior to the transformation in the transmitter. Later, this signal is used to modulate at a modulator 21 the carrier wave supplied from a carrier oscillator 22, and is led to a facsimile receiver 23 to record a picture that corresponds to the transmitted facsimile picture.

In connection with the foregoing embodiments, shift registers have been referred to as the memory elements in the transmitter and the receiver. Such elements, however, are not necessarily shift registers but may be any memory elements having at least twenty-bit memory capacity and enabling the clock pulses to store and read out, with similar technical effect. Examples of the elements usable for this purpose are flip-flop circuits, memory cores, delay lines, memory tubes, magnetic tapes, and others. With some types of memory elements, it is possible to deal not only with binary signals but also analog signals whose level varies in a continuous manner.

Now, a more detailed explanation will be given about the clock pulse train 102 used in concentrating and expanding the facsimile signal in the first embodiment. As has already been mentioned, the clock pulse train consists of a continuous pulse train *a* and a succession of pulse groups *b*. A pulse group *b* enclosed by a broken-line circle 102' is shown at 102'' on an enlarged scale. The continuous pulse train *a* is in synchronism with the vertical synchronizing signal train 101 and its repetition frequency is an integral multiple of the latter. The pulse groups *b* which have the same repetition frequency as the vertical synchronizing signal train 101, appear within the duration of the vertical blanking intervals of the television signal on which superposition is to be effected, and have group phase and width offset from the pulses of the continuous pulse train *a*. Furthermore, the repetition frequency of the continuous pulse train *a* is determined by the maximum frequency of the facsimile signal to be sampled thereby at the transmitter and should be about two to four times as large as the maximum frequency. The number of pulses contained in each pulse group *b* must be equal to the number of pulses of the continuous pulse train *a* existing within a period of the vertical synchronization, namely, equal to the value of the integral multiple, as is evident from the foregoing signal transformation process of the signal transforming or recovering block. As for the width of the pulse groups *b*, the maximum is determined by the number of pulses to be contained and by the transmission band width of the television signal, while the minimum is determined so as not to be shorter than a period of the continuous pulse train *a* in order to prevent any misoperation which would otherwise occur due to the coexistence of the pulse train *a* and the pulse groups *b*. The phase of the pulse groups *b* is determined with reference to the continuous pulse train *a* so that both may be offset from each other. In addition, each pulse of the pulse groups *b*, in consideration of superposition on the television signal, must be offset from the synchronizing signal portions of the television signal. To examine the first embodiments in this regard, the repetition frequency of 1200 cycles selected for the continuous pulse train *a* makes it possible to transmit the facsimile signal whose maximum picture frequency is as high as 600 cycles. Inasmuch as the repetition frequency of the continuous pulse train *a* is 1200 cycles and that of the television vertical synchronizing signal train is 60 cycles, it follows that one period of the continuous pulse train *a* corresponds to about twelve periods of the horizontal synchronism, that the number of pulses contained in each pulse group is twenty bits, and that the selection of five periods of the horizontal synchronism for the width of each pulse group sets the number of pulses of the pulse groups contained in each period of the horizontal synchronism at four bits, namely, the repetition frequency thereof the 63 kilocycles.

Now, another embodiment will be described for carrying the system of this invention into effect. With the receiver of the first embodiment shown in FIG. 3, a block of relatively complicated construction such as that of the transmitter is required to produce the clock pulse train 102, the pulse groups *b* of which are used to detect the concentrated binary signal train. It is desirable, however, on adopting this invention to television broadcasting, to provide simplified and yet stable and less expensive receivers even at the sacrifice of complexity of the transmitter in view of the fast that a number of receivers are used with only one transmitter. In order to satisfy this desired, a modulation system is proposed wherein the signal to be supported is not a mere binary signal but a binary signal carrying the phase reference which corresponds to the pulse groups *b* of the clock pulse train 102. A modulation system according to this proposal will now be described as the second embodiment.

Figure 4:
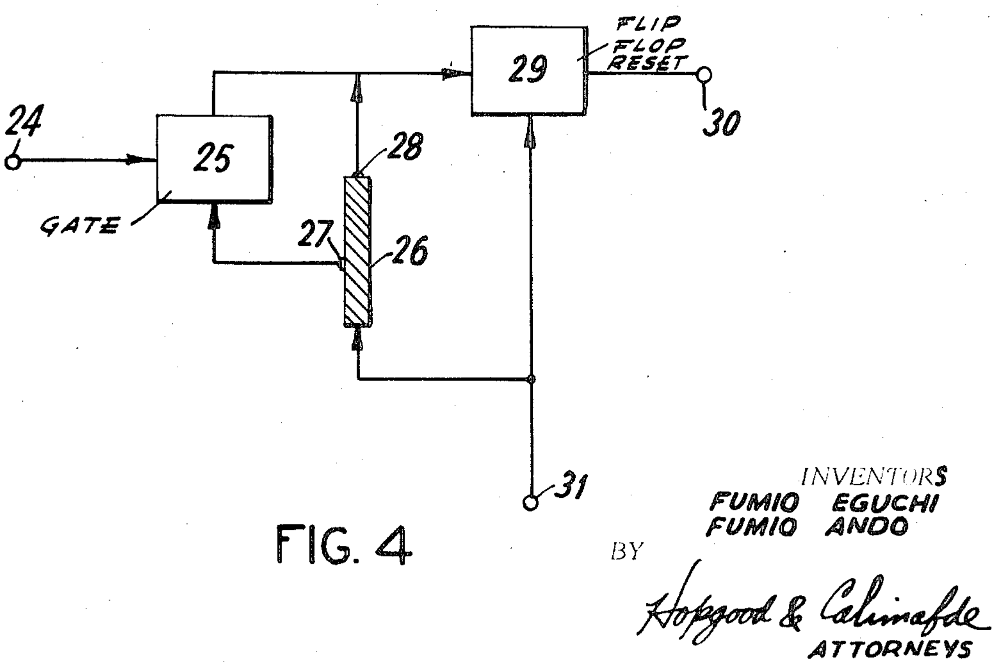
FIG. 4 is a block diagram of the principal portion of another embodiment of the transmitter of this invention.
Figure 5:
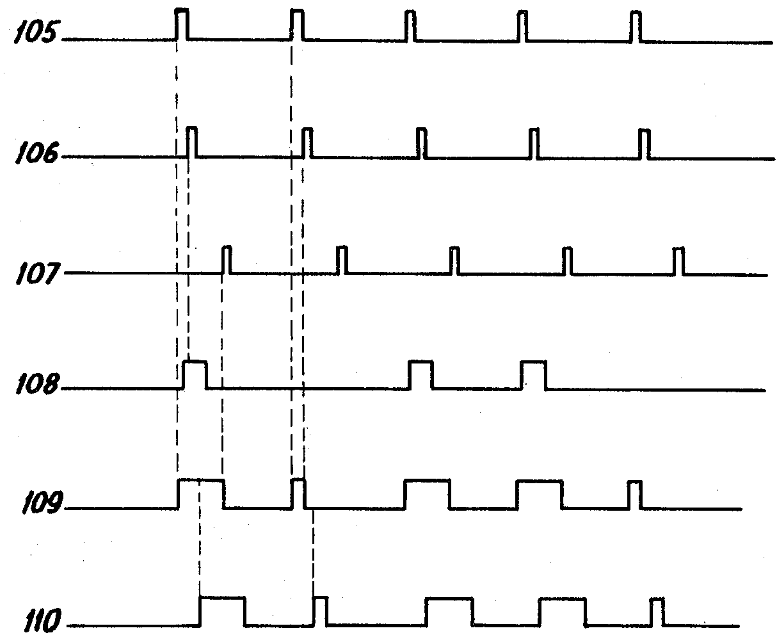
FIG. 5 shows wave forms for explaining the portions illustrated in FIGS. 4 and 6.

Reference will now be had to FIG. 4 which is a block diagram showing the principal portion of the transmitter of the second embodiment and to FIG. 5 which illustrates the appropriate wave forms. With this second embodiment, it is assumed that the original wave forms of two signals to be multiplexed, the number of bits, the period of the clock pulses, and the like are the same as those of the first embodiments.

Referring to FIG. 4, a terminal 31 receives a signal corresponding to the pulse groups *b* in the clock pulse train 102 of the first embodiment, which signal is supplied to a flip-flop circuit 29 and a delay circuit 26. The flip-flop circuit 29 has two input terminals for set and reset pulses respectively. The set pulse terminal receives the signal directly from the terminal 31, while the reset pulse input terminal receives the signal through the delay circuit 26. The delay circuit 26 has one input terminal and two output terminals 27 and 28. Output terminal 27 produces pulses 106 delayed by one microsecond from the pulses 105 of the input signal, and output terminal 28 derives pulses 107 delayed by 4 microseconds from the pulses 105. Another terminal 24 receives a signal 108 that is similar to the output signal of the shift register 6 in the first embodiment signal 108 is supplied to a gate 25 receiving at the other input terminal the pulses 106 from the output terminal 27 of the delay circuit. In this embodiment, the pulses 106 are blocked and allowed to pass when the pulses 108 assume the binary 1 and 0 levels, respectively. In combination, the flip-flop circuit 29 is set by the pulses 105 to be reset by the pulses 107 derived at the output terminal 28 and is actually reset, when the binary signal 108 assumes binary 1 and binary 0, by the leading edge of the pulse 107 and by the output pulse 106 which leads by three microseconds and which has passed through the gate 25, respectively, to supply signal pulses such as shown at 109 to an output terminal 30. It is to be noted here that while light and shade of the facsimile original picture are represented by the presence and absence of pulses in the first embodiment, they are represented by the width of the pulses, or by pulse-width modulation (PWM), in the second embodiment.

Figure 6:
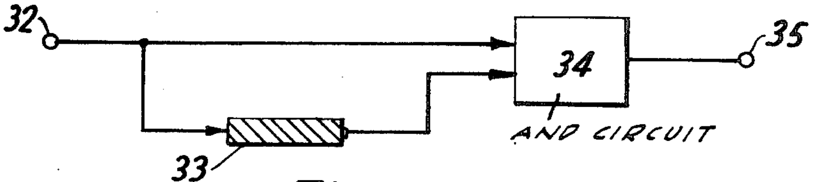
FIG. 6 is a block diagram of the principal portion of another embodiment of the receiver of this invention.

To explain an example of the demodulator of the second embodiment with reference to FIG. 6 showing the principal portion of a PWM receiver, the facsimile signal separated from the television signal is shown in FIG. 5 as the output signal 109 of FIG. 4 and is supplied from an output terminal 32 directly to one of the two input terminals of an AND circuit 34 and to the other input terminal of circuit 34 through a 2-microsecond delay circuit 33. Inasmuch as the two input signals to the AND circuit 34 are of the wave forms shown at 109 and 110 in FIG. 5, pulses are supplied to an output terminal 35 when pulses are simultaneously present at both input signals of AND circuit 34. The resulting wave form corresponds to the light and shade binary signal 108 produced at the transmitter.

Figure 7:
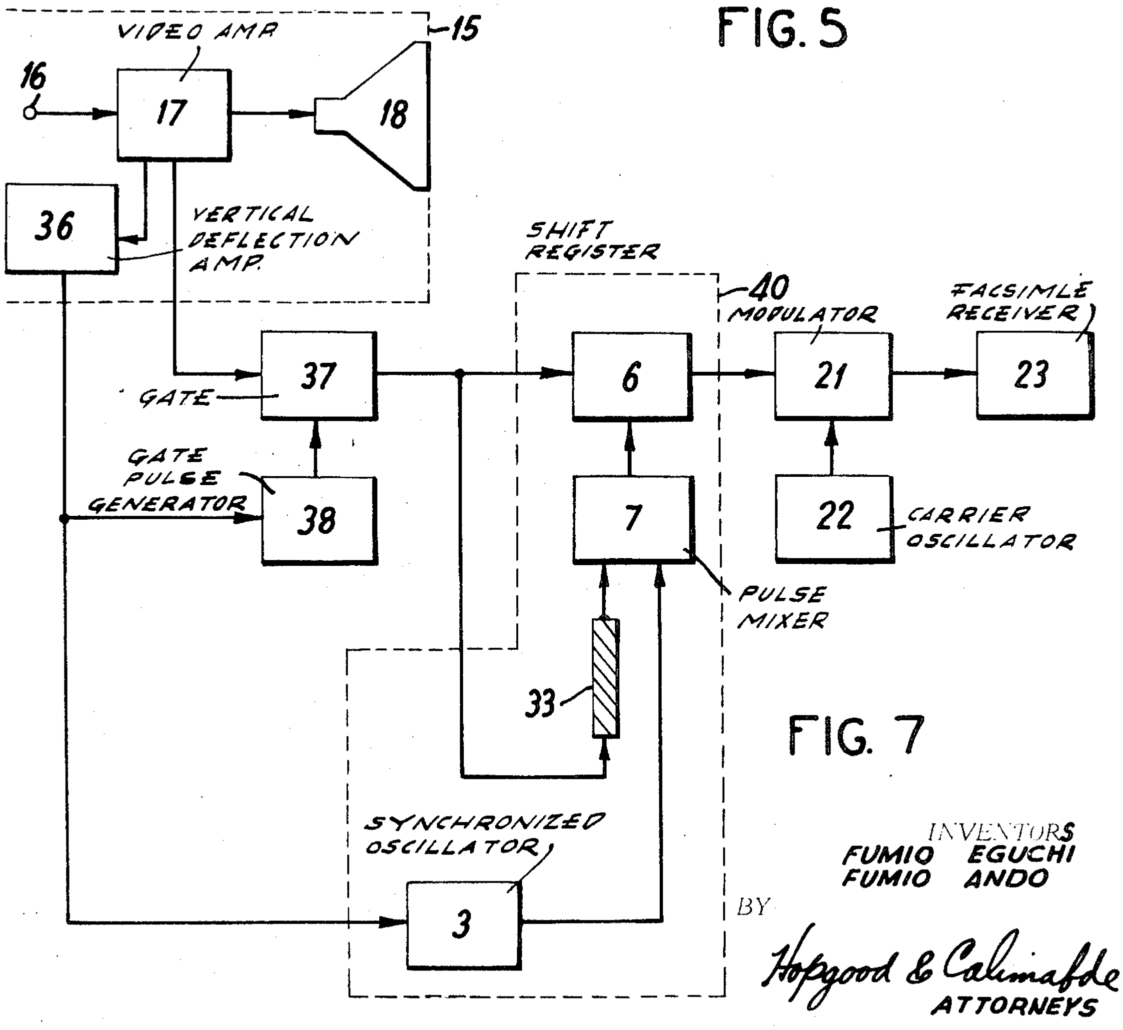
FIG. 7 is a block diagram of a receiver employing the embodiment shown in FIG. 6.

An example of the receiver according to the pulse-width modulation principle is shown in FIG. 7.

Numeral 36 in the television receiver 15 shows a vertical deflection amplifier, from which the vertical synchronizing pulses are taken out. Numeral 37 indicates a gate similar to gate 19 in FIG. 3, and numeral 38 illustrates a circuit similar to the gate pulse generator 4 in FIG. 3. Portion 40 enclosed by the broken line corresponds to the signal transformation block 20 of FIG. 3. The AND circuit 34 of FIG. 6 is comprised in the signal transformation block 40 by the input circuit to the shift register 6. The mixer 7 performs the same operation as in the afore-mentioned blocks 9 and 20 and produces the clock pulse train 102 for the shift register 6. The output signal of the signal transformation block 40 is utilized, after being processed as in the embodiment of FIG. 3, to produce the fascimile records.

In the description just mentioned, the phase of the trailing edges of the pulses whose leading edges appear at a given repetition period has been modulated according to the content of the signal. It is, however, possible with a similar circuit to effect modulation of the phase of the leading edges of pulses whose trailing edges appear at a constant period and thus to achieve the same technical merits with the same receiver circuit. More particularly, it is possible to use as the reset pulses for the flip-flop circuit 29, the pulses 105 used as the set pulses and to supply to the flipflop circuit 29 as the set pulses those pulses 106 and 107 used as the reset pulses which are interswitched according to the binary value of the binary signal 108.

With the second embodiments so far explained, the relation between the two widths of the broad and narrow pulses and the delay time of the delay circuit is so determined as mentioned above so that the pulses, when caused to pass through the delay circuit, may at once be converted into a signal whose amplitude varies between two values. According to the second embodiment wherein one of the leading and the trailing edges of the pulses of the superposed signals carries the information and the other serves to provide the phase reference, it becomes possible to greatly simplify the demodulating portion of the receiver. According to the first embodiment wherein the clock pulses for detecting the facsimile information are derived from the television synchronizing signal, not only the clock pulse generator is complicated but also the phase, the number, the width, and the like of the clock pulses are subject to the condition for operating the circuit with the resulting misoperation. In contrast, each pulse of the second embodiment has a dual function of serving as a clock pulse and carrying the information so that misoperation seldom occurs and the stability of the receiver depends entirely on the delay circuit. The delay circuit for providing the short delay time as required here, if composed of passive circuit elements, can easily provide stable delay time and warrant certainty of operation. Furthermore, the second embodiments wherein the input signal to the shift register may in principle be pulses of any period with the maximum operable speed of the shift register or be an aperiodic signal, are applicable, as they stand, to superpose a discrete signal corresponding to the facsimile signal on discrete intervals other than the intervals where the television synchronizing signal occur, with the receivers of the second embodiment unchanged. In other words, this pulse-width modulation system, if combined with a memory element such as a shift register accompanying an AND circuit, serves easily to derive amplitude modulated information from aperiodic information and to remarkably contribute to the simplification of the receivers.

Figure 8:
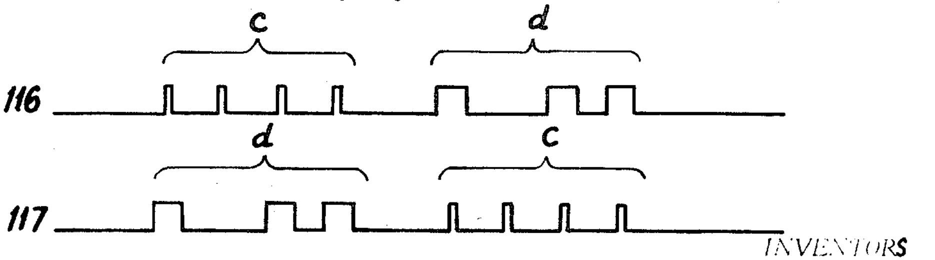
FIG. 8 shows wave forms for explaining the principles of a third embodiment of this invention.

Further examples of the binary signals which carry the phase reference information are signal pulses used in the second embodiment plus phase reference pulses corresponding to the respective signal pulses. As shown in FIG. 8, a phase reference pulse group *c* is arranged separated from a signal pulse group and placed prior or posterior to the signal pulse group. The phase reference pulse group is employed in demodulation.

Pulse train 116 shows the phase reference pulse group *c* placed prior to each signal pulse group *d*. In the demodulator, the phase reference pulse group *c* is taken out and provided in a delay circuit with time delay so that the phase reference pulses may coincide with the corresponding signal pulses.

In pulse train 117, the signal pulse group *d* leads the phase reference pulse group *c*. Therefore, the signal pulse group *d* is delayed on demodulation.

In either case, it becomes necessary, when the repetition periods of the pulses of each group are very short, to raise the precision and the stability of the delay circuit dependent on the interval between the phase reference pulse group *c* and the signal pulse group *d*.

In the description so far given, the signals to be multiplexed have been the television signal and the facsimile signal. It is, however, possible to use instead of the television signal any other signal having periodic idle intervals and instead of the facsimile signal any other binary signal in carrying out the multiplex communication. Furthermore, the signal to be superimposed may be two or more signals which are concentrated in the manner explained in conjunction with the embodiments of this invention into different intervals, respectively. Still further, the multiplex communication of this invention is not only applicable to a binary signal but also to a sampled signal of three or more values, by the addition of circuits for separating out and combining into such values and memory elements corresponding to the number of samples.

This invention, when applied to multiplex communication of television and facsimile signals, makes it possible with the addition of simple devices to the transmitting and the receiving ends to broadcast simultaneously television and facsimile, without any modification of the transmitter, the repeaters, and the similar apparatus, and without any adverse effects on the reception of the television signal which plays the principal role. This invention thus has a great utility.

While the invention has so far been explained in conjunction with respect to specific embodiments, this invention is not limited to such embodiments and various modification is possible without departing from the spirit of the invention.

We claim:

1. An electrical communication system for transmitting a principal signal having periodically repeating idle intervals, and a continuous additional signal through a communication channel having a frequency bandwidth only for said principal signal, said system comprising a source of sampling pulses having a repetition frequency equal to an integral multiple greater than one of the repetition frequency of said idle intervals, means for sampling, quantizing and storing in digital form said additional signal in response to said sampling pulses; means for reading out the stored quantized signal within said idle intervals in said principal signal in response to a second pulse train appearing within said idle interval, the number of pulses in said second pulse train in each of said idle intervals being equal in number to the number of pulses in said first pulse train appearing within a repetition period of said idle intervals; and means for adding the read out pulses in timed relationship to said principal signal.

2. The communication system of claim 1, further comprising means for pulse-width modulating said additional signal in response to said read out pulses.

3. In combination with the electrical communication system of claim 1, a signal receiving apparatus comprising means for reproducing said principal signal having said periodic idle intervals, means for separating from said principal signal said additional signal contained therein in a time-compressed fashion in said idle intervals, and means for time-expanding said separated additional signal to reproduce said additional signal.

4. The combination of claim 3, in which said receiving apparatus further comprises means coupled to said separating means for pulse-width demodulating said time-compressed signals.

5. The electrical communication system of claim 3, in which said time-expanding means is a shift register.

6. The communication system of claim 1, in which said principal signal is a television signal and at said additional signal a facsimile signal.

7. The communication system of claim 6, in which the repetition rate of said sampling pulses is an integral multiple of the repetition frequency of the blanking signal of said television signal.

8. The communication system of claim 1, in which said storing means is a shift register.

9. An electrical communication system for transmitting a television signal and a facsimile signal through a communication channel having a frequency bandwidth only for said television signal, said system comprising a shift register for digitally storing said facsimile signal in response to first shift pulses having a repetition frequency of an integral multiple greater than one of the repetition frequency of the blanking signal of said television signal, said digital storing of said facsimile signal resulting in the simultaneous sampling and quantizing of said facsimile signal, means for reading out the stored pulses from said shift register within the blanking period of said television signal in response to second shift pulses, the number of said second shift pulses included within one blanking period of said television signal being equal to the number of said first shift pulses included within one repetition period of said blanking signal, means for adding the read out pulses to said television signal, and means for transmitting said facsimile signal superimposed on said television signal.

10. In combination with the communication system of claim 9, a signal receiving apparatus comprising means for reproducing said television signal containing time-compressed pulses produced from said facsimile signal in the blanking period of said television signal, means for separating said time-compressed pulses from said television signal, a second shift register, means for storing said time-compressed pulses in said second shift register during said blanking period in response to third shift pulses, means for reading out the stored pulses from said second shift register in response to fourth shift pulses, the number of said fourth shift pulses included within one repetition period of said blanking signal being equal to the number of said third shift pulses included within one of said blanking periods, means for reproducing said facsimile signal from the read out signals, and means for producing a facsimile picture in response to said reproduced facsimile signal.

* * * * *